US011869146B2

(12) United States Patent
Teranishi et al.

(10) Patent No.: US 11,869,146 B2
(45) Date of Patent: Jan. 9, 2024

(54) THREE-DIMENSIONAL MODEL GENERATION METHOD AND THREE-DIMENSIONAL MODEL GENERATION DEVICE

(71) Applicant: Panasonic Intellectual Property Management Co., Ltd., Osaka (JP)

(72) Inventors: Kensho Teranishi, Osaka (JP); Satoshi Yoshikawa, Hyogo (JP); Toru Matsunobu, Osaka (JP); Masaki Fukuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/748,331

(22) Filed: May 19, 2022

(65) Prior Publication Data

US 2022/0284672 A1 Sep. 8, 2022

Related U.S. Application Data

(63) Continuation of application No. PCT/JP2020/042715, filed on Nov. 17, 2020.

(30) Foreign Application Priority Data

Nov. 20, 2019 (JP) .................. 2019-210052

(51) Int. Cl.
*G06T 17/05* (2011.01)
*G06T 7/80* (2017.01)
*G06T 7/55* (2017.01)

(52) U.S. Cl.
CPC ............... *G06T 17/05* (2013.01); *G06T 7/55* (2017.01); *G06T 7/80* (2017.01); *G06T 2200/04* (2013.01); *G06T 2200/08* (2013.01)

(58) Field of Classification Search
None
See application file for complete search history.

(56) References Cited

U.S. PATENT DOCUMENTS 10,872,462 B2 * 12/2020 Nishiyama ............ G06T 15/205
11,189,041 B2 * 11/2021 Takama ................. H04N 23/90
2014/0293016 A1 10/2014 Benhimane et al.

FOREIGN PATENT DOCUMENTS

| JP | 2016-152027 | 8/2016 |
| JP | 2017-130146 | 7/2017 |
| JP | 2017-182564 | 10/2017 |

OTHER PUBLICATIONS

International Search Report (ISR) dated Feb. 2, 2021 in International (PCT) Application No. PCT/JP2020/042715.

(Continued)

*Primary Examiner* — James A Thompson
(74) *Attorney, Agent, or Firm* — Wenderoth, Lind & Ponack, L.L.P.

(57) ABSTRACT

A three-dimensional model generation method includes: obtaining map information generated by camera calibration executed by controlling one or more cameras to shoot a subject from a plurality of viewpoints, the map information including three-dimensional points each indicating a position on the subject in a three-dimensional space; obtaining a first image from a first view point and a second image from a second viewpoint; determining a search range in the three-dimensional space, based on the map information, the search range including a first three-dimensional point on the subject, the first three-dimensional point corresponding to a first point in the first image; searching for a similar point that is similar to the first point, in a range in the second image which corresponds to the search range; and generating a three-dimensional model using a search result in the searching.

14 Claims, 10 Drawing Sheets

(56) References Cited

OTHER PUBLICATIONS

Extended European Search Report dated Jan. 5, 2023 in corresponding European Patent Application No. 20889960.9.

* cited by examiner

THREE-DIMENSIONAL MODEL GENERATION METHOD AND THREE-DIMENSIONAL MODEL GENERATION DEVICE

CROSS REFERENCE TO RELATED APPLICATIONS

This is a continuation application of PCT International Application No. PCT/JP2020/042715 filed on Nov. 17, 2020, designating the United States of America, which is based on and claims priority of Japanese Patent Application No. 2019-210052 filed on Nov. 20, 2019. The entire disclosures of the above-identified applications, including the specifications, drawings and claims are incorporated herein by reference in their entirety.

FIELD

The present disclosure relates to a three-dimensional model generation method and a three-dimensional model generation device.

BACKGROUND

Patent Literature (PTL) 1 discloses a technique of generating a three-dimensional model of a subject, using images obtained by shooting the subject from a plurality of viewpoints.

CITATION LIST

Patent Literature

PTL 1: Japanese Unexamined Patent Application Publication No. 2017-130146

SUMMARY

Technical Problem

In the generating of three-dimensional models, there is a demand for improving three-dimensional model generation accuracy as well as reducing processing time.

The present disclosure provides a three-dimensional model generation method, etc., capable of improving three-dimensional model generation accuracy and shortening the processing time for the generating of three-dimensional models.

Solution to Problem

A three-dimensional model generation method according to an aspect of the present disclosure is a three-dimensional model generation method executed by an information processing device, and includes: obtaining map information generated by camera calibration executed by controlling one or more cameras to shoot a subject from a plurality of viewpoints, the map information including three-dimensional points each indicating a position on the subject in a three-dimensional space; obtaining a first image of the subject shot from a first view point and a second image of the subject shot from a second viewpoint; determining a search range in the three-dimensional space, based on the map information, the search range including a first three-dimensional point on the subject, the first three-dimensional point corresponding to a first point in the first image; searching for a similar point that is similar to the first point, in a range in the second image which corresponds to the search range; and generating a three-dimensional model using a search result in the searching.

A three-dimensional model generation device according to an aspect of the present disclosure includes: a processor; and memory, wherein, using the memory, the processor: obtains map information generated by camera calibration executed by controlling one or more cameras to shoot a subject from a plurality of viewpoints, the map information including three-dimensional points each indicating a position on the subject in a three-dimensional space; obtains a first image of the subject shot from a first view point and a second image of the subject shot from a second viewpoint; determines a search range in the three-dimensional space, based on the map information, the search range including a first three-dimensional point on the subject, the first three-dimensional point corresponding to a first point in the first image; searches for a similar point that is similar to the first point, in a range in the second image which corresponds to the search range; and generates a three-dimensional model using a result of the search.

It should be noted that the present disclosure may be implemented as a program that causes a computer to execute the steps included in the three-dimensional model generation method described above. Furthermore, the present disclosure may be implemented as a non-transitory computer-readable recording medium, such as a CD-ROM, having the above program recorded thereon. Furthermore, the present disclosure may be implemented as information, data, or signal representing the above program. In addition, the program, information, data, and signal may be distributed via a communication network such as the Internet.

Advantageous Effects

The present disclosure can provide a three-dimensional model generation method, etc., capable of improving three-dimensional model generation accuracy and shortening the processing time for the generating of three-dimensional models.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
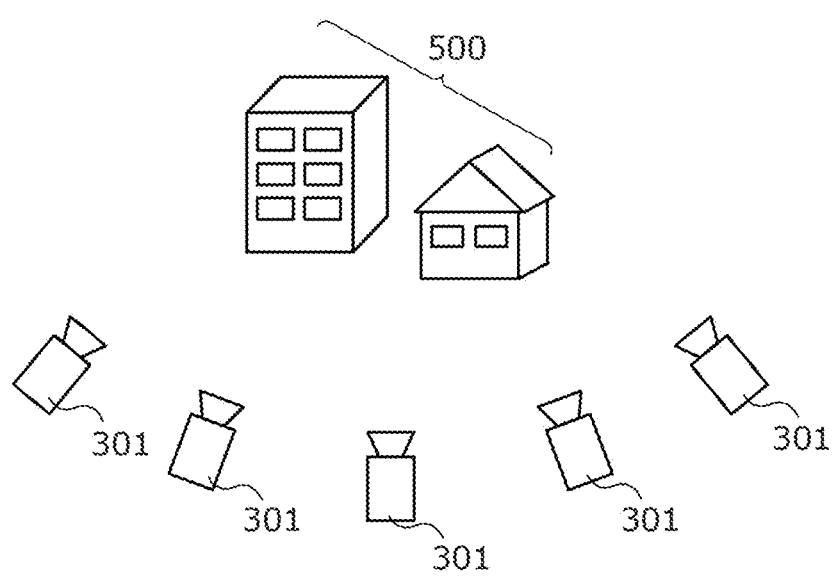
FIG. 1 is a diagram for describing an outline of a three-dimensional model generation method according to Embodiment 1.

DESCRIPTION OF EMBODIMENTS (Circumstances Leading to the Present Disclosure)

In the technique disclosed in PTL 1, a three-dimensional model is generated by searching for a similar point between images. Typically, in the searching of a similar point, when a similar point of a single pixel of a single image is searched for from another image, an epipolar line on the other image is calculated from a geometric constraint of a camera, and searching for all pixels on the epipolar line is performed. For this reason, there is room for improvement in the similar point search processing speed. Furthermore, there is the problem that, when a similar subject is present on the epipolar line, the wrong similar point may be searched for, which, in such a case, leads to the deterioration of search accuracy.

In view of this, the present disclosure provides a three-dimensional model generation method, etc., capable of improving three-dimensional model generation accuracy and shortening the processing time for the generating of three-dimensional models.

A three-dimensional model generation method according to an aspect of the present disclosure is a three-dimensional model generation method executed by an information processing device, and includes: obtaining map information generated by camera calibration executed by controlling one or more cameras to shoot a subject from a plurality of viewpoints, the map information including three-dimensional points each indicating a position on the subject in a three-dimensional space; obtaining a first image of the subject shot from a first view point and a second image of the subject shot from a second viewpoint; determining a search range in the three-dimensional space, based on the map information, the search range including a first three-dimensional point on the subject, the first three-dimensional point corresponding to a first point in the first image; searching for a similar point that is similar to the first point, in a range in the second image which corresponds to the search range; and generating a three-dimensional model using a search result in the searching.

Accordingly, the search range is determined based on the map information, and a similar point that is similar to a first point on the first image is searched for in a range that corresponds to a search range on the second image which is limited by the search range. In this manner, since the search for the similar point is performed in a range in which the similar point is highly likely to be present, based on the map information, the similar point search accuracy can be improved and the time required for the search processing can be shortened. Therefore, the three-dimensional model generation accuracy can be improved, and the processing time for the three-dimensional model generation processing can be shortened.

Furthermore, for example, the search range may be a range in a shooting direction from the first viewpoint, and in the searching, an epipolar line in the second image may be limited to a length that is in accordance with the search range, and the similar point that is similar to the first point may be searched for on the epipolar line in the second image, the epipolar line corresponding to the first point.

Accordingly, since the similar point that is similar to the first point is searched for on an epipolar line that has been limited to a length that is in accordance to the search range, the search accuracy of the similar point can be improved and the time needed for the search processing can be shortened.

Furthermore, for example, the determining may include interpolating, using the three-dimensional points included in the map information, a three-dimensional point at which the subject is estimated to be present, the three-dimensional point being interpolated between two points included in the three-dimensional points, and in the determining, the search range may be determined using the three-dimensional points after interpolation in the interpolating.

Accordingly, since a three-dimensional point at which the subject is estimated to be present is interpolated between two points of the three-dimensional points, the search range can be accurately determined.

Furthermore, for example, in the interpolating, the three-dimensional point at which the subject is estimated to be present may be interpolated in a region defined by three points included in the three-dimensional points.

Accordingly, since a three-dimensional point at which the subject is estimated to be present is interpolated in a region defined by three points of the three-dimensional points, the search range can be accurately determined.

Furthermore, for example, in the determining: a distance image may be generated by estimating, for each of regions in a projection image obtained by projecting the three-dimensional points onto the first image, a three-dimensional position on the subject which corresponds to the region and has the first viewpoint as a reference, the distance image including the three-dimensional positions respectively estimated for the regions; and the search range may be determined based on each of the three-dimensional positions of the regions in the distance image.

Accordingly, since a three-dimensional position is calculated for each of regions on the projection image, as many three-dimensional positions as required for matching can be calculated.

Furthermore, for example, in the determining, for the search range which is determined for each of the regions in the distance image, the search range may be set to be wider as an estimation accuracy of the three-dimensional position of the region is lower.

Accordingly, by setting the search range to be wider as the accuracy of the interpolated three-dimensional position on the three-dimensional shape, it is possible to determine a search range that is in accordance with the accuracy.

Furthermore, for example, the estimation accuracy of the three-dimensional position may be higher as a distance of the three-dimensional position from the first viewpoint is less.

For this reason, it is possible to determine a search range that is in accordance with the distance of the three-dimensional position from the first viewpoint.

Furthermore, for example, the estimation accuracy of the three-dimensional position may be higher as the three-dimensional position is closer to at least one three-dimensional point among the three-dimensional points.

For this reason, it is possible to determine a search range that is in accordance with the distance of the three-dimensional position from at least one of the three-dimensional points.

Furthermore, for example, the estimation accuracy of the three-dimensional position may be higher as a density of the three-dimensional points in the region in which the three-dimensional position is present is higher.

For this reason, it is possible to determine a search range that is in accordance with the density of the three-dimensional points in the region in which the three-dimensional position is present.

Furthermore, for example, in the camera calibration, positions and orientations of the one or more cameras may be calculated, and the first image and the second image may be included among images shot for the camera calibration.

Furthermore, a three-dimensional model generation device according to an aspect of the present disclosure includes: a first obtainer configured to obtain map information generated by camera calibration executed by controlling one or more cameras to shoot a subject from a plurality of viewpoints, the map information including three-dimensional points each indicating a position on the subject in a three-dimensional space; a second obtainer configured to obtain a first image of the subject shot from a first view point and a second image of the subject shot from a second viewpoint; a determiner configured to determine a search range in the three-dimensional space, based on the map information, the search range including a first three-dimensional point on the subject, the first three-dimensional point corresponding to a first point in the first image; a matcher configured to search for a similar point that is similar to the first point, in a range in the second image which corresponds to the search range; and a generator configured to generate a three-dimensional model using a search result of the matcher.

Accordingly, the search range is determined based on the map information, and a similar point that is similar to a first point on the first image is searched for in a range that corresponds to a search range on the second image which is limited between images. In this manner, since the search for the similar point is performed in a limited search range, the similar point search accuracy can be improved and the time required for the search processing can be shortened.

Hereinafter, respective embodiments of a three-dimensional model generation method, etc., according to the present disclosure will be described in detail with reference to the drawings. It should be noted that each of the subsequently described embodiments shows a specific example of the present disclosure. Accordingly, numerical values, shapes, materials, structural components, the arrangement and connection of the structural components, steps, and the processing order of the steps, etc., shown in each of the following embodiments are merely examples, and are therefore not intended to limit the scope of the present disclosure.

Furthermore, the respective figures are not necessarily precise illustrations. In the figures, structural components that are substantially the same are assigned the same reference signs, and overlapping description thereof may be omitted or simplified.

Embodiment 1

[Outline]

First, referring to FIG. 1, the outline of a three-dimensional model generation method according to Embodiment 1 will be described.

Figure 2:
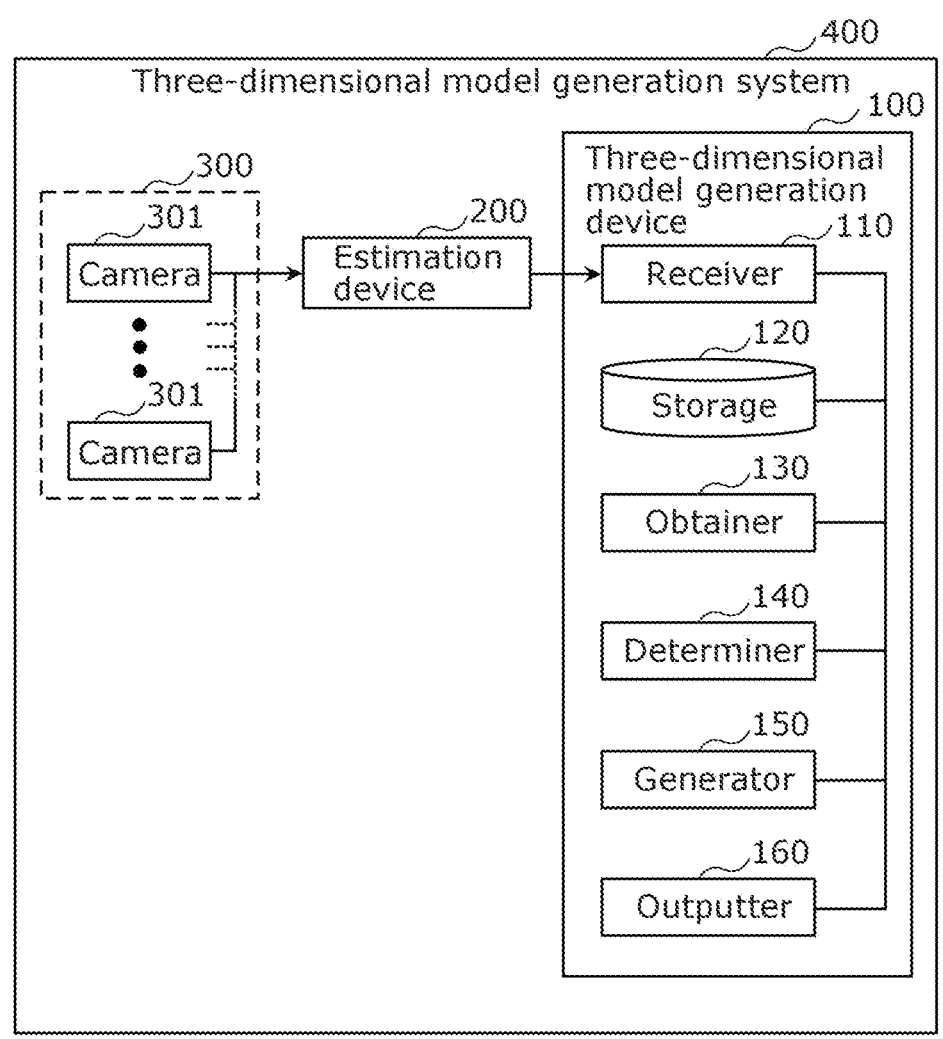
FIG. 2 is a block diagram illustrating the characteristic configuration of a three-dimensional model generation device according to Embodiment 1.

FIG. 1 is a diagram for describing the outline of the three-dimensional model generation method according to Embodiment 1. FIG. 2 is a block diagram illustrating the characteristic configuration of three-dimensional model generation device 100 according to Embodiment 1.

In the three-dimensional model generation method, as illustrated in FIG. 1, the three-dimensional model of a predetermined region is generated from a plurality of images shot from a plurality of different viewpoints using a plurality of cameras 301. Here, the predetermined region is a region including a stationary static object or a moving animal body such as a person, or the both. In other words, the predetermined region is a region including, for example, at least one of a stationary static object or a moving animal body as a subject.

As an example of the predetermined region including a static object and an animal body, there is a venue where a sport game such as a basketball game is being held, a space on a road where a person or a vehicle exists, or the like. Note that the predetermined region may include not only a specific object to be used as a subject, but also scenery, etc. FIG. 1 illustrates a case where subject 500 is a building. Additionally, hereinafter, the predetermined region including not only a specific object to be used as a subject, but also scenery, etc. is also simply called the subject.

As illustrated in FIG. 2, three-dimensional model generation system 400 includes camera group 300 including a plurality of cameras 301, estimation device 200, and three-dimensional model generation device 100.

(Cameras)

Cameras 301 are imaging devices that shoot a predetermined area. Each of cameras 301 shoots a subject, and outputs each of a plurality of shot frames to estimation device 200. In Embodiment 1, two or more cameras 301 are included in camera group 300. Additionally, cameras 301 shoot the same subject from a plurality of mutually different viewpoints. A frame is, in other words, an image.

Note that, although it has been assumed that three-dimensional model generation system 400 includes camera group 300, three-dimensional model generation system 400 is not limited to this, and may include one camera 301. For example, in three-dimensional model generation system 400, while moving one camera 301, the one camera 301 may be caused to generate, for a subject that exists in a real space, a multi-viewpoint image formed from a plurality of frames having mutually different viewpoints. The plurality of frames are frames shot (generated) with cameras 301 that differ from each other in at least one of the positions or orientations of cameras 301, respectively.

Additionally, each camera 301 may be a camera that generates a two-dimensional image, or a camera with a three-dimensional measuring sensor that generates a three-dimensional model. In Embodiment 1, each of cameras 301 is a camera that generates a two-dimensional image.

Each of cameras 301 may be directly connected to estimation device 200 by wired communication or wireless communication, so as to be able to output the shot frames to estimation device 200, or may be indirectly connected to estimation device 200 via a hub, such as a communication equipment or a server, which is not illustrated.

Note that the frames shot with cameras 301, respectively, may be output to estimation device 200 in real time. Additionally, after the frames are once recorded in external storage devices, such as a memory or a cloud server, the frames may be output from these external storage devices to estimation device 200.

Additionally, cameras 301 may be fixed cameras such as surveillance cameras, respectively, may be mobile cameras such as video cameras, smart phones, or wearable cameras, or may be moving cameras such as drones with a shooting function.

(Estimation Device)

Estimation device 200 performs camera calibration by causing one or more cameras 301 to shoot a subject from a plurality of viewpoints. Estimation device 200 performs the camera calibration that estimates the positions and orientations of cameras 301 based on, for example, a plurality of frames shot with cameras 301. Here, the orientation of camera 301 indicates at least one of the shooting direction of camera 301, or the inclination of camera 301. The shooting direction of camera 301 is the direction of the optical axis of camera 301. The inclination of camera 301 is the rotation angle around the optical axis of camera 301 from a reference orientation.

Specifically, estimation device 200 estimates camera parameters of cameras 301, based on a plurality of frames obtained from cameras 301. Here, the camera parameters are parameters that indicates the characteristics of cameras 301, and are a plurality of parameters that includes internal parameter including a focal point distance, an image center, etc. of camera 301, and external parameters indicating the position (more specifically, three-dimensional position) and orientation of camera 301. That is, the position and orientation of each of cameras 301 are obtained by estimating respective camera parameters.

Note that the estimation method of estimating, by estimation device 200, the positions and orientations of cameras 301 is not particularly limited. Estimation device 200 may estimate the positions and orientations of cameras 301 by using, for example, the Visual-SLAM (Simultaneous Localization and Mapping) technology. Alternatively, estimation device 200 may estimate the positions and orientations of cameras 301 by using, for example, the Structure-From-Motion technology.

Here, a generation method of map information by estimation device 200 will be described using FIG. 3.

Figure 3:
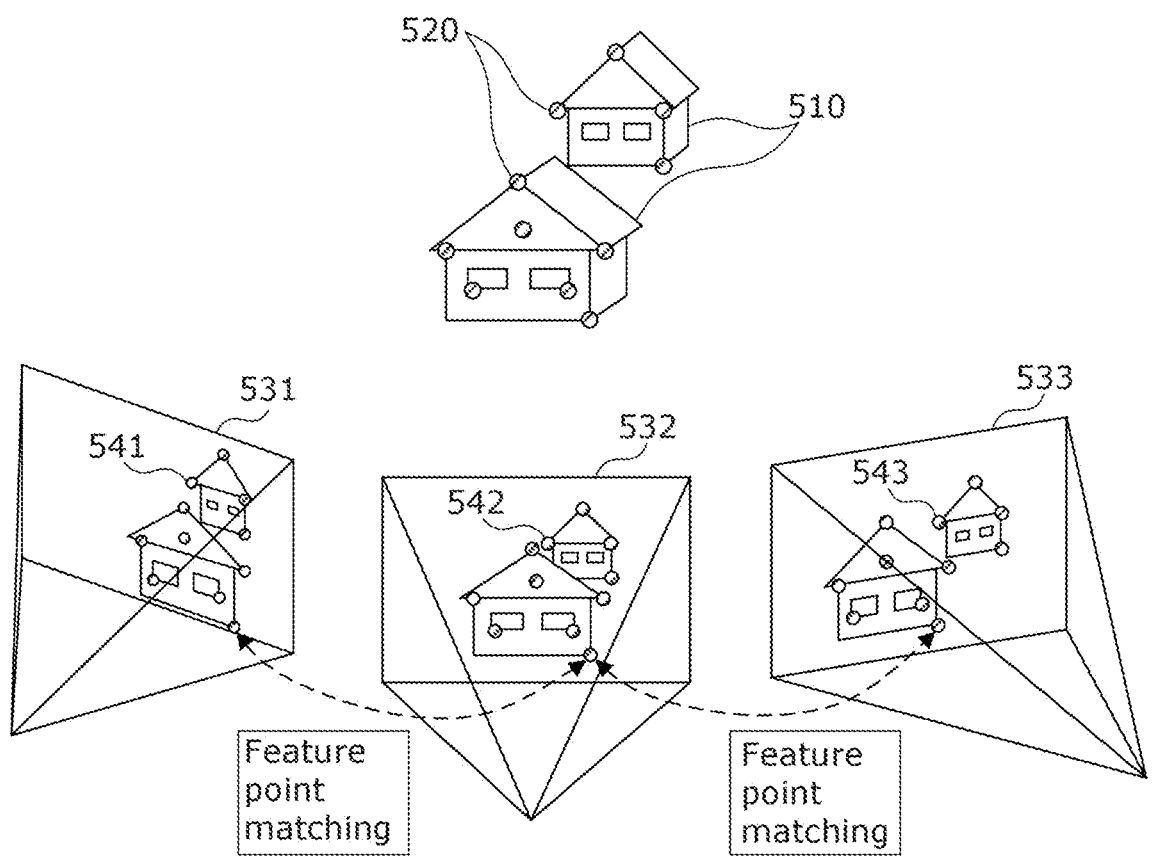
FIG. 3 is a diagram for describing a mag information generation method performed by an estimation device.

As illustrated in FIG. 3, estimation device 200 performs searching for feature points by extracting characteristic points from frames 531, 532, and 533 shot with cameras 301 as feature points 541, 542, and 543, respectively, by using the Visual-SLAM technology or the Structure-From-Motion technology, and extracts a set of similar points that are similar between a plurality of frames among the extracted feature points 541, 542, and 543. Since estimation device 200 can identify a point on subject 510 reflected in common in frames 531, 532, and 533 by performing the searching for feature points, the three-dimensional coordinates of the point on subject 510 can be obtained with the principle of triangulation by using the set of the extracted similar points.

In this manner, estimation device 200 can estimate the position and orientation of each camera 301 by extracting a plurality of sets of similar points, and using the sets of similar points. In the process of estimating the position and orientation of each camera 301, estimation device 200 calculates three-dimensional coordinates for each set of similar points, and generates map information 520 including a plurality of three-dimensional points indicated by the plurality of calculated three-dimensional coordinates. Each of the plurality of three-dimensional points indicates the position on the subject in the three-dimensional space. Estimation device 200 obtains, as estimation results, the position and orientation of each camera 301, and the map information. Since the obtained map information is processed for optimization with the camera parameters, the obtained map information is information with higher accuracy than predetermined accuracy. Additionally, the map information includes the three-dimensional position of each of the plurality of three-dimensional points. Note that the map information may include not only the plurality of three-dimensional positions, but also the color of each three-dimensional point, the surface shape around each three-dimensional point, information indicating the frame from which each three-dimensional point is generated, etc.

Additionally, in order to increase the speed of the estimation processing, estimation device 200 may generate map information including a sparse three-dimensional point cloud by limiting the number of sets of similar points to a predetermined number. Because estimation device 200 can estimate the position and orientation of each camera 301 with sufficient accuracy, even with the predetermined number of sets of similar points. Note that the predetermined number may be determined to be a number with which the position and orientation of each camera 301 can be estimated with sufficient accuracy. Additionally, estimation device 200 may estimate the position and orientation of each camera 301 by using sets that are similar at or above a predetermined degree of similarity among the sets of similar points. As a result, estimation device 200 can limit the number of sets of similar points used for the estimation processing to the number of sets that are similar at or above the predetermined similarity.

Additionally, based on, for example, the position and orientation of camera 301 estimated by using the above-described technology, estimation device 200 may calculate the distance between camera 301 and a subject as a camera parameter. Note that three-dimensional model generation system 400 may include a distance measurement sensor, and the distance between camera 301 and the subject may be measured by using the distance measurement sensor.

Estimation device 200 may be directly connected to three-dimensional model generation device 100 by wired communication or wireless communication, or may be indirectly connected to estimation device 200 via a hub, such as a communication equipment or a server, which is not illustrated. Accordingly, estimation device 200 outputs a plurality of frames received from cameras 301, and a plurality of estimated camera parameters of cameras 301 to three-dimensional model generation device 100.

Note that an estimation result by estimation device 200 may be output to three-dimensional model generation device 100 in real time. Additionally, after the estimation result is once recorded in external storage devices, such as a memory or a cloud server, the estimation result may be output from these external storage devices to three-dimensional model generation device 100.

Estimation device 200 includes at least a computer system that includes, for example, a control program, a processing circuit such as a processor or a logical circuit that executes the control program, and a recording device such as an internal memory or an accessible external memory storing the control program.

(Three-Dimensional Model Generation Device)

Three-dimensional model generation device 100 generates the three-dimensional model of a predetermined area, based on a plurality of frames shot with cameras 301, and an estimation result of estimation device 200. Specifically, three-dimensional model generation device 100 is a device that performs three-dimensional model generation processing that generates the three-dimensional model of a subject in a virtual three-dimensional space, based on the respective camera parameters of cameras 301, and the plurality of frames.

Note that the three-dimensional model of the subject is data including the three-dimensional shape of the subject and the color of the subject that are restored in the virtual three-dimensional space from the frames obtained by shooting the actual subject. The three-dimensional model of the subject is a set of points indicating the respective three-dimensional positions of a plurality of points on the subject reflected to each of a plurality of two-dimensional images shot with a plurality of cameras 301 from multiple viewpoints, that is, a plurality of different viewpoints.

A three-dimensional position is represented by, for example, three-value information formed from a X component, a Y component, and a Z component that indicate the positions on an X-axis, a Y-axis, and a Z-axis that are orthogonal to each other, respectively. Note that the information included in a plurality of points indicating three-dimensional positions may include not only the three-dimensional positions (that is, information indicating coordinates), but also information indicating the color of each point, information representing the surface shapes of each point and its surrounding, etc.

Three-dimensional model generation device 100 includes at least a computer system that includes, for example, a control program, a processing circuit such as a processor or a logical circuit that executes the control program, and a recording device such as an internal memory or an accessible external memory storing the control program. Three-dimensional model generation device 100 is an information processing device. The function of each processing unit of three-dimensional model generation device 100 may be realized by software, or may be realized by hardware.

Additionally, three-dimensional model generation device 100 may store the camera parameters in advance. In this case, three-dimensional model generation system 400 need not include estimation device 200. Additionally, cameras 301 may be communicatively connected to three-dimensional model generation device 100 wirelessly or with wires.

Additionally, frames shot with cameras 301 may be directly output to three-dimensional model generation device 100. In this case, cameras 301 may be directly connected to three-dimensional model generation device 100 by wired communication or wireless communication, or may be indirectly connected to three-dimensional model generation device 100 via a hub, such as a communication equipment or a server, which is not illustrated.

[Configuration of Three-Dimensional Model Generation Device]

Subsequently, referring to FIG. 2, the details of the configuration of three-dimensional model generation device 100 will be described.

Three-dimensional model generation device 100 is a device that generates a three-dimensional model from a plurality of frames. Three-dimensional model generation device 100 includes receiver 110, storage 120, obtainer 130, determiner 140, generator 150, and outputter 160.

Receiver 110 receives, from estimation device 200, frames shot with cameras 301, and an estimation result by estimation device 200. Accordingly, receiver 110 obtains a first frame (first image) of a subject shot from a first viewpoint, and a second frame (second image) of the subject shot from a second viewpoint. That is, the frames received by receiver 110 include the first frame and the second frame. Receiver 110 outputs the received frames and estimation result to storage 120. Receiver 110 is, for example, a communication interface for communicating with estimation device 200. When three-dimensional model generation device 100 and estimation device 200 perform wireless communication, receiver 110 includes, for example, an antenna and a wireless communication circuit. Alternatively, when three-dimensional model generation device 100 and estimation device 200 perform wired communication, receiver 110 includes, for example, a connector connected to a communication line, and a wired communication circuit. Receiver 110 is an example of a first obtainer and a second obtainer. In this manner, the first obtainer and the second obtainer may be realized by one processing unit, or may be realized by two processing units, each independent of the other. Note that receiver 110 may receive frames from cameras 301 without going through estimation device 200.

Storage 120 stores a plurality of frames and estimation results that are received by receiver 110. Additionally, storage 120 stores a search range calculated by determiner 140. Note that storage 120 may store processing results of a processing unit included in three-dimensional model generation device 100. Storage 120 stores, for example, a control program executed by each processing unit included in three-dimensional model generation device 100. Storage 120 is realized by, for example, an HDD (Hard Disk Drive), flash memory, etc.

Obtainer 130 obtains, from storage 120, the map information in the estimation result stored in storage 120, and outputs the map information to determiner 140. Additionally, obtainer 130 obtains, from storage 120, a plurality of frames, and the camera parameters of each camera 301 in the estimation result, which are stored in storage 120, and outputs them to generator 150.

Note that three-dimensional model generation device 100 need not include storage 120 and obtainer 130. In this case, receiver 110 may output, to determiner 140, the map information in the estimation result received from estimation device 200. Additionally, receiver 110 may output, to generator 150, the frames received from cameras 301, and the camera parameters of each camera 301 in the estimation result received from estimation device 200.

Determiner 140 determines the search range to be used for searching for a plurality of similar points between a plurality of frames, based on the map information obtained from storage 120 by obtainer 130. The search range is a range in the three-dimensional space including a first three-dimensional point on a subject corresponding to a first point on a first frame. The search range can also be said to be a range in the three-dimensional space where the first three-dimensional point is likely to exist. Additionally, the search range is a range in the shooting direction from the first viewpoint with which the first frame is shot. Determiner 140 uses a plurality of three-dimensional points included in the map information to interpolate a three-dimensional point at which the subject is estimated to be present between the plurality of three-dimensional points.

In the map information, as described above, the three-dimensional shape of the subject is represented by a sparse three-dimensional point cloud. Determiner 140 estimates a rough three-dimensional position of a subject surface by filling the spaces between a plurality of three-dimensional points included in the sparse three-dimensional point cloud with a plurality of planes, and generates an estimation result as three-dimensional information. Accordingly, determiner 140 increases the density of the sparse three-dimensional point cloud included in the map information to be a dense three-dimensional point cloud.

Specifically, determiner 140 estimates, for each of a plurality of pixels on a projection frame obtained by projecting a plurality of three-dimensional points onto the first frame, a three-dimensional position on the subject that corresponds to the pixel and has the first viewpoint, with which the first frame is shot, as a reference. Accordingly, determiner 140 generates a distance image including a plurality of pixels each including the estimated three-dimensional position.

Note that a plurality of frames used for camera calibration may be the same as or may be different from a plurality of frames used for generation of a three-dimensional model. That is, the first frame and the second frame may be included in a plurality of frames shot for the camera calibration.

Figure 4:
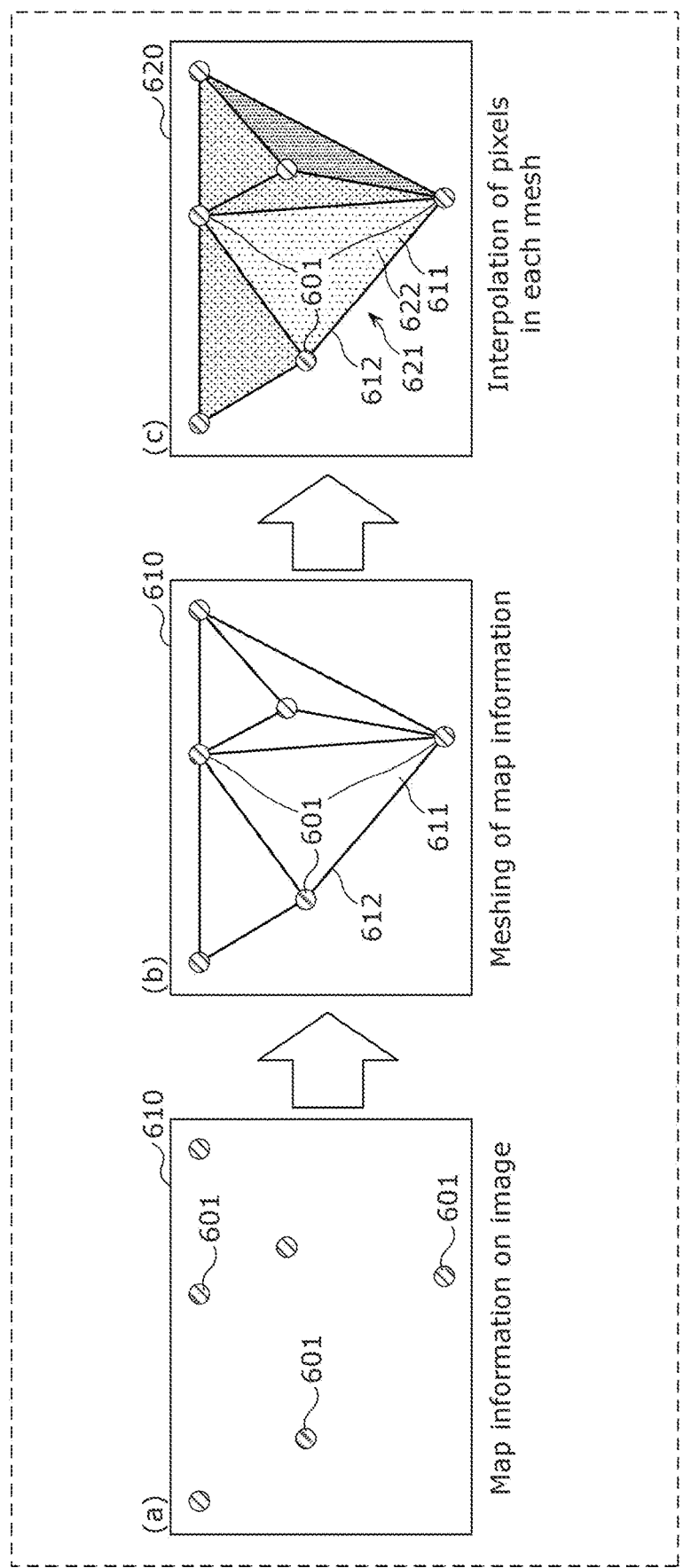
FIG. 4 is a diagram for describing a first interpolation method of interpolating a three-dimensional position between a plurality of three-dimensional points.

Two kinds of methods can be considered for the interpolation method of interpolating a plurality of three-dimensional points with a plurality of planes. First, a first interpolation method will be described by using FIG. 4. FIG. 4 is a diagram for describing the first interpolation method of interpolating a three-dimensional position between a plurality of three-dimensional points.

In the first interpolation method, determiner 140 uses a plurality of three-dimensional points included in the map information to mesh the plurality of three-dimensional points, so as to interpolate a three-dimensional position on the subject between the plurality of three-dimensional points. For example, as illustrated in (a) in FIG. 4, determiner 140 obtains projection frame 610 in which a plurality of three-dimensional points 601 included in the map information are projected on the first frame of a plurality of frames. Determiner 140 may obtain projection frame 610 by projecting the plurality of three-dimensional points 601 onto the first frame, or when the map information includes information indicating to which frame's feature points the plurality of three-dimensional points 601 correspond, may obtain projection frame 610 by associating the feature points on the first frame with three-dimensional points 601 by using the information.

Next, as illustrated in (b) in FIG. 4, determiner 140 meshes the map information on projection frame 610 onto which the map information is projected, and forms a plurality of meshes 611. Each mesh is a polygon having a plurality of three-dimensional points 601 as vertices, and surrounded by a plurality of sides 612 connecting two adjacent points of the plurality of three-dimensional points.

Then, as illustrated in (c) in FIG. 4, determiner 140 calculates the equation of plane for each mesh 611, and generates three-dimensional shape 621 in which each mesh 611 has been interpolated with plane 622. Thereafter, determiner 140 generates distance image 620 in which a three-dimensional position is indicated for each pixel, by calculating, for each pixel in projection frame 610, a three-dimensional position on three-dimensional shape 621 that corresponds to the pixel and has the first viewpoint, with which the first frame is shot, as a reference. In this manner, determiner 140 interpolates plane 622 for each mesh 611, which is a region defined by three points of three-dimensional points 601 included in the map information. Accordingly, determiner 140 interpolates a three-dimensional point at which the subject is estimated to be present.

Note that the equation of plane is calculated as follows. Determiner 140 calculates the equation of plane from vertices of mesh 611, that is, three-dimensional points 601. When the vertices of mesh 611 are a point A, a point B, and a point C, determiner 140 obtains the equation of plane by calculating the normal vector of a plane

[Math. 1]

$$\overrightarrow{(l, m, n)}$$

from the outer product indicated in Equation 1.

[Math. 2]

$$\overrightarrow{AB} \times \overrightarrow{AC} = \overrightarrow{(l, m, n)} \quad \text{(Equation 1)}$$

The equation of plane is represented by Equation 2 from Equation 1.

$$lX+mY+nZ=D \quad \text{(Equation 2)}$$

Here, D is a value calculated from the values of l, m, and n, and the three-dimensional coordinates of a three-dimensional point in a plane. When the three-dimensional coordinates of the three-dimensional point in the plane are $(X_d, Y_d, Z_d)$, D is represented by Equation 3.

$$D=lX_d+mY_d+nZ_d \quad \text{(Equation 3)}$$

Next, the three-dimensional coordinates are converted into coordinates of the image coordinate system of the first frame by using Equation 4 and Equation 5.

$$x=X/Z \quad \text{(Equation 4)}$$

$$y=Y/Z \quad \text{(Equation 5)}$$

Z can be represented by Equation 6 by using Equation 3, Equation 4, and Equation 5.

$$1/Z=lx/D+my/D+n/D \quad \text{(Equation 6)}$$

Here, X, Y, and Z indicate the three-dimensional positions in plane 622 of mesh 611, and x and y indicate image coordinates of the first frame in plane 622 of that mesh 611, that is, a two-dimensional position. Note that, in the above-described calculation by determiner 140, it is assumed that the camera that shoots the first frame is a pinhole camera.

Plane 622 is mainly a triangle and a square. Determiner 140 may exclude an erroneous mesh of the generated meshes. For example, when the three-dimensional distance of an edge of a mesh (that is, the length of the edge in the three-dimensional space) is larger than an arbitrary value, determiner 140 may exclude the mesh having the edge with the three-dimensional distance larger than the arbitrary value for three-dimensional distance as an erroneous mesh.

Figure 5:
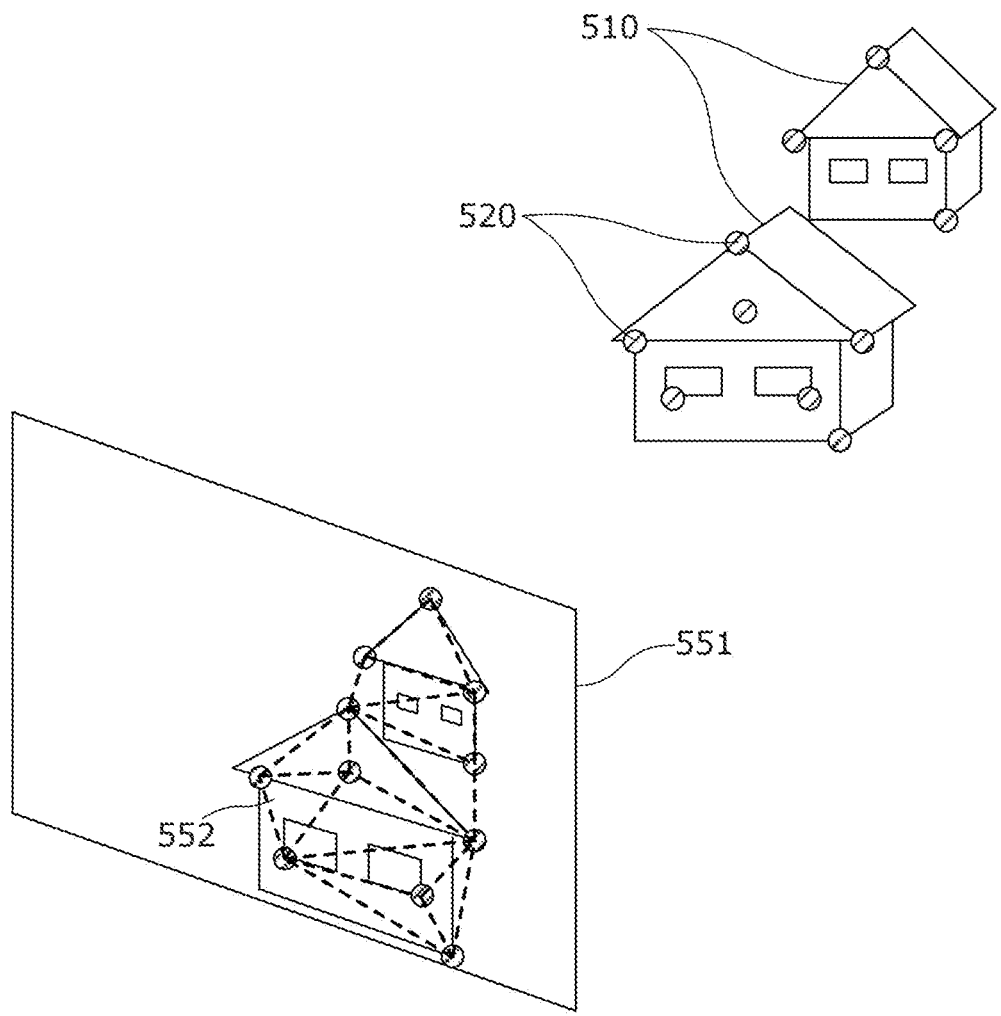
FIG. 5 is a diagram illustrating an example in which map information is meshed in a projection frame onto which the map information illustrated in FIG. 3 is projected.

For example, as illustrated in FIG. 5, in projection frame 551 in which the map information is projected onto the first frame by using the map information illustrated in FIG. 3, determiner 140 meshes map information 520, calculates the equation of plane of each mesh 552, and estimates the three-dimensional shape of subject 510. Then, for each pixel of projection frame 551, determiner 140 calculates the distance from the first viewpoint to a point on the three-dimensional shape to which the pixel corresponds, and determines the search range based on the calculated distance.

Figure 6:
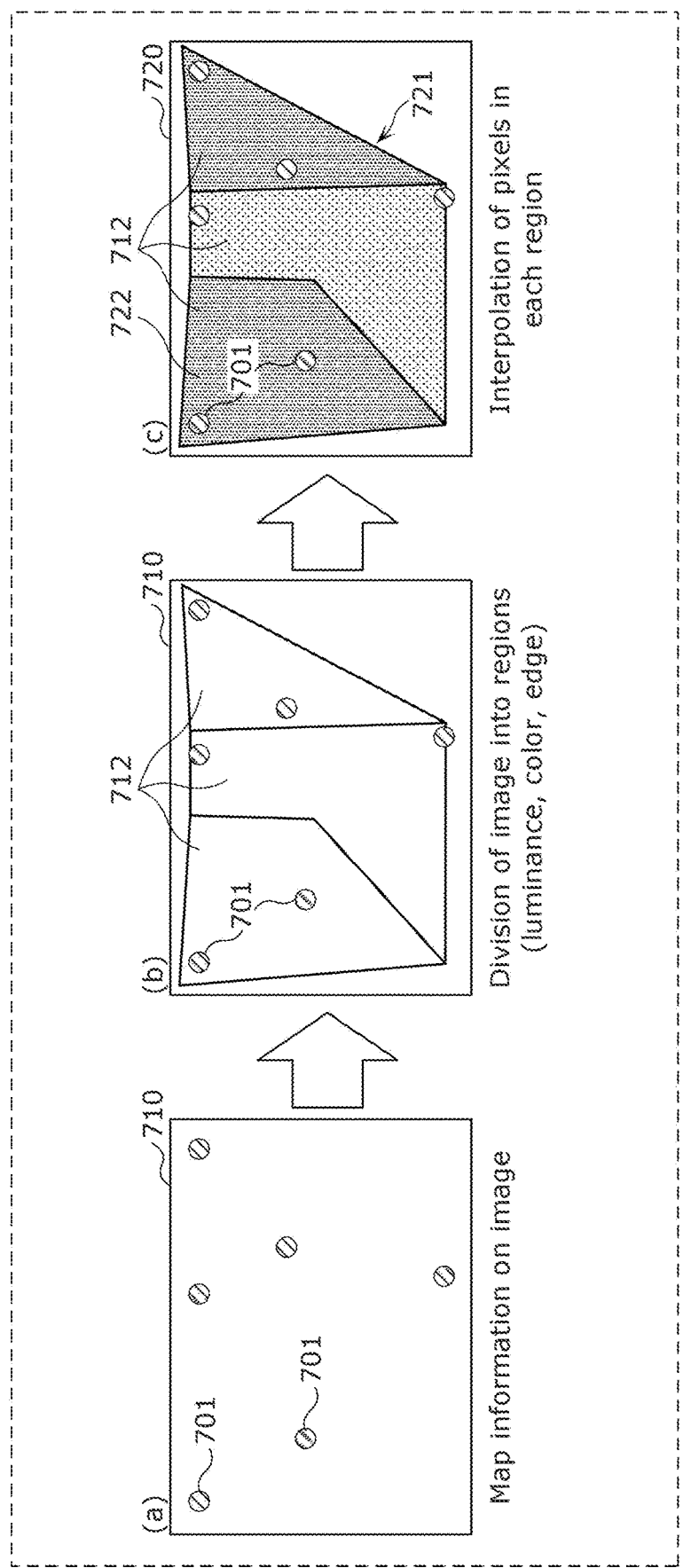
FIG. 6 is a diagram for describing a second interpolation method of interpolating a three-dimensional position between a plurality of three-dimensional points.

Next, a second interpolation method will be described by using FIG. 6. FIG. 6 is a diagram for describing the second interpolation method of interpolating a three-dimensional position between a plurality of three-dimensional points.

In the second interpolation method, determiner 140 divides a first frame into a plurality of regions by using the pixel value of each pixel of the first frame of a plurality of frames, and uses, for each of the divided regions, a plurality of three-dimensional points projected onto the first frame to interpolate a three-dimensional position on a subject between the plurality of three-dimensional points. For example, as illustrated in (a) in FIG. 6, determiner 140 obtains projection frame 710 in which a plurality of three-dimensional points 701 included in map information are projected onto a first frame of a plurality of frames. Determiner 140 may obtain projection frame 710 by projecting a plurality of three-dimensional points 701 onto the first frame, or when the map information includes information indicating to which frame's feature points the plurality of three-dimensional points 701 correspond, may obtain projection frame 710 by associating the feature points on the first frame with three-dimensional points 701 by using the information.

Next, as illustrated in (b) in FIG. 6, on projection frame 710 onto which the map information is projected, determiner 140 divides projection frame 710 into a plurality of regions 712 by using the pixel value of each pixel of projection frame 710. Determiner 140 may determine the set of a lump of pixels having similar luminance and similar colors to be one region by using, for example, at least one of the luminance, color, or edge obtained from the pixel value of each pixel of projection frame 710, or may determine a region partitioned by edges to be one region. Similar luminance refers to a luminance group included in the width of a predetermined luminance range smaller than the luminance range from the minimum luminance to the maximum luminance that can be represented as pixel values. Additionally, similar colors refers to a color group included in the width of a predetermined color difference range.

Then, as illustrated in (c) in FIG. 6, determiner 140 generates distance image 720 in which a three-dimensional position is indicated for each pixel by using, for each of divided regions 712, one or more three-dimensional points 701 included in that region 712 to estimate the three-dimensional position on the subject at each position of a plurality of pixels included in each region 712 in projection frame 710. Determiner 140 estimates the average of the distances from the first viewpoint to one or more three-dimensional points 701 included in a corresponding region 712 as the three-dimensional position on the subject at each position of the plurality of pixels included in each region 712.

Note that the average of the distances is calculated as follows.

Let one three-dimensional point 701 located in each region 712 be Pn={Xn, Yn, Zn}. Here, {X, Y, Z} are the three dimensional coordinates in a camera coordinate system, and n={1, . . . , N}. N is the number of three-dimensional points included in map information.

The average of the distances from the first viewpoint, that is, the position of a camera, to each of three-dimensional points 701 in region 712 is calculated by Equation 7.

[Math. 3]

$$Z_{mean} = \frac{\sum_1^N \sqrt{X_n^2 + Y_n^2 + Z_n^2}}{N} \quad \text{(Equation 7)}$$

Next, using Equation 8 and Equation 9, the coordinates of the image coordinate system of the first frame are converted into three dimensional coordinates.

$X = Z_{mean} \times x$  (Equation 8)

$Y = Z_{mean} \times y$  (Equation 9)

Determiner 140 interpolates a three-dimensional position in each region 712 by using Equation 7, Equation 8, and Equation 9. Therefore, determiner 140 generates three-dimensional shape 721 in which each region 712 is interpolated with plane 722 at a constant distance from the first viewpoint. Thereafter, determiner 140 generates distance image 720 in which a three-dimensional position is indicated for each pixel, by calculating, for each pixel in projection frame 710, a three-dimensional position on three-dimensional shape 721 that corresponds to the pixel and has the first viewpoint, with which the first frame is shot, as a reference.

Note that, in the above-described calculation by determiner 140, it is assumed that the camera that shoots the first frame is a pinhole camera.

Note that, when a plurality of three-dimensional points 701 are included in region 712, and one three-dimensional point of them is a point that is distant from a set of the other three-dimensional points by an arbitrary value or more, determiner 140 may exclude the one three-dimensional point that is distant by the arbitrary value or more from the targets of distance averaging.

Figure 7:
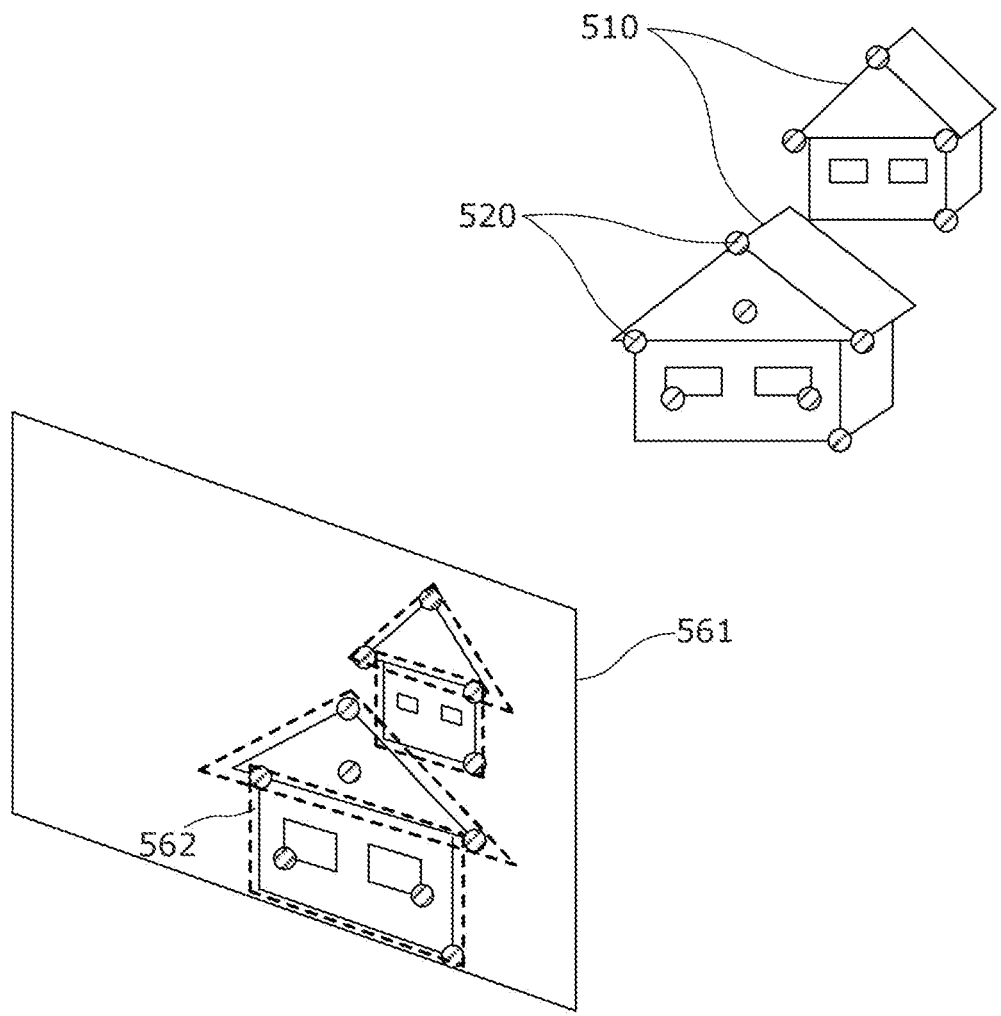
FIG. 7 is a diagram illustrating an example in which the projection frame 561 onto which the map information illustrated in FIG. 3 is projected is divided into a plurality of regions.

For example, as illustrated in FIG. 7, determiner 140 divides projection frame 561 in which the map information is projected onto the first frame into a plurality of regions 562 by using the map information illustrated in FIG. 3, and for each of the plurality of divided regions 562, estimates the three-dimensional shape of subject 510 by using one or more three-dimensional points included in each region. Then, determiner 140 calculates, for each pixel of projection frame 561, the distance from the first viewpoint to a point on the three-dimensional shape to which the pixel corresponds, and determines a search range based on the calculated distance.

Note that, in the second interpolation method, when the first frame is divided into a plurality of regions, determiner 140 may divide the first frame into a plurality of regions by using a learning model learned by machine learning. The learning model used in this case may be, for example, a model that is generated by machine learning using correct data obtained by dividing, by a person, a plurality of frames for learning into a plurality of regions for each subject in advance.

Additionally, in both of the above-described two interpolation methods, although it has been assumed that determiner 140 interpolates a three-dimensional position on the subject in the first frame, that is, the projection frame obtained by projecting a plurality of three-dimensional points included in map information onto a two-dimensional image, it is not limited to this. Determiner 140 may interpolate a three-dimensional position on the subject in the three-dimensional space. Note that the three-dimensional position interpolated here may be indicated by a point cloud, or may be indicated by a plane.

Additionally, in both of the above-described two interpolation methods, when projecting a plurality of three-dimensional points included in map information onto the first frame, determiner 140 may project, onto the first frame, a point cloud that is visible from the first viewpoint with which the first frame is shot, and need not project a point cloud that is not visible from the first viewpoint. That is, determiner 140 may project, onto the first frame, a point cloud in a surface on the first viewpoint side of the subject, and need not project a point cloud in a surface on the opposite side of the first viewpoint of the subject.

Additionally, determiner 140 may interpolate a three-dimensional position on the subject by using a learning model learned by machine learning. The learning model is, for example, a model that is generated by machine learning using a plurality of pieces of data for learning, and each of the plurality of pieces of data for learning in this case may be data including a combination of the obtained three-dimensional point cloud data of a subject for learning, and a plurality of images that are obtained by shooting the subject for learning from a plurality of different viewpoints. The three-dimensional point-cloud data may be data obtained by using a distance sensor, etc. for each subject. That is, in machine learning, by using three-dimensional point cloud data as correct data, and using each of a plurality of images, a learning model for estimating the position of a three-dimensional point on the subject reflected to the image is generated.

Additionally, although it has been assumed that determiner 140 interpolates a three-dimensional point at which the subject is estimated to be present on a plane, it is not limited to this. For example, determiner 140 may interpolate a three-dimensional point at which the subject is estimated to be present between two points of a plurality of three-dimensional points included in map information. That is, determiner 140 may interpolate a three-dimensional point at which the subject is estimated to be present with a line segment connecting the two points.

Based on the three-dimensional position indicated by each pixel of the distance image obtained with the first interpolation method or the second interpolation method, determiner 140 determines a search range including the three-dimensional position on a straight line connecting the first viewpoint to the three-dimensional position. Specifically, determiner 140 determines a range with a predetermined size having the three-dimensional position as the middle point to be the search range. Additionally, specifically, determiner 140 obtains the distance from the first viewpoint to a point corresponding to the position of each pixel on the subject, and determines the size of the search range in accordance with the obtained distance. The search range is a search range for searching for a point that is similar to the point of each pixel of the first frame, from a frame different from the first frame.

For the search range determined for each of a plurality of pixels in the distance image, determiner 140 sets the search range to be wider as the estimation accuracy of the three-dimensional position of a corresponding pixel is lower.

Specifically, determiner 140 may determine that the estimation accuracy of the three-dimensional position of a corresponding pixel is lower as the distance of a three-dimensional position to be estimated from the first viewpoint is less. This is because, since one pixel is a region having an area in two dimensions, the closer to the first viewpoint the three-dimensional position to which the one pixel corresponds, the smaller the region of that three-dimensional position in a three-dimensional space. That is, the closer to the first viewpoint, the narrower the region where the estimated three-dimensional position is likely to exist, and thus the higher the estimation accuracy of the three-dimensional position. In this manner, determiner 140 determines the search range such that the smaller the distance of a three-dimensional position from the first viewpoint, the smaller the search range.

Additionally, in the first interpolation method, determiner 140 may determine that the estimation accuracy of the three-dimensional position of a corresponding pixel is higher as the three-dimensional position to be estimated is closer to at least one three-dimensional point among a plurality of three-dimensional points included in map information. This is because, since the three-dimensional shape of a subject is estimated by generating a mesh having a plurality of three-dimensional points as vertices in the first interpolation method, the closer to the three-dimensional points, the higher the estimation accuracy of the three-dimensional shape of the subject. That is, the closer to at least one three-dimensional point in a plurality of three-dimensional points, the higher the possibility that the estimated three-dimensional position exists at a position close to an actual three-dimensional position of the subject. In this manner, determiner 140 determines the search range such that the closer to at least one of a plurality of three-dimensional points the three-dimensional position, the smaller the search range.

Note that, in this case, determiner 140 may determine, for a three-dimensional position in a mesh, the estimation accuracy of the three-dimensional position by using the distance between the three-dimensional position and one three-dimensional point of a plurality of three-dimensional points located at the vertices of the mesh. Determiner 140 may determine, for a three-dimensional position in a mesh, the estimation accuracy of the three-dimensional position by using the average value of a plurality of distances between the three-dimensional position and each of a plurality of three-dimensional points located at the vertices of the mesh.

For example, for each of a plurality of three-dimensional points located at the vertices of a mesh, determiner 140 arranges a predetermined Gaussian distribution spread over a distance image centered at the center of gravity of a pixel in which the three-dimensional point is located. The predetermined Gaussian distribution is arranged so that the average of the predetermined Gaussian distribution coincides with the center of gravity of the above-described pixel. Therefore, the probability density of the predetermined Gaussian distribution is the highest at the position of the center of gravity of the above-described pixel, and becomes lower for a pixel that is further away from the position of the center of gravity of the pixel. Determiner 140 may determine that the higher the probability density of the predetermined Gaussian distribution assigned by arranging the predetermined Gaussian distribution to the distance image, the higher the estimation accuracy of the three-dimensional position of a corresponding pixel.

Note that determiner 140 may arrange, for each of a plurality of meshes, the predetermined Gaussian distribution spread over the distance image centered at the center of gravity of the mesh. In this case, the predetermined Gaussian distribution is arranged such that the average of the predetermined Gaussian distribution coincides with the center of gravity of the mesh. Therefore, the probability density of the predetermined Gaussian distribution is the highest at the position of the center of gravity of the above-described mesh, and becomes lower for a pixel that is further away from the position of the center of gravity of the pixel. Determiner 140 may determine that the higher the probability density of the predetermined Gaussian distribution assigned by arranging the predetermined Gaussian distribution to the distance image, the lower the estimation accuracy of the three-dimensional position of a corresponding pixel.

Additionally, determiner 140 may determine that the estimation accuracy of the three-dimensional position of a corresponding pixel is higher as the density of a plurality of three-dimensional points included in map information in a region where a three-dimensional position to be estimated exists is higher. This is because a three-dimensional position in a region where the density of a plurality of three-dimensional points is higher is located at a position closer to any one of the three-dimensional points. For example, in the first interpolation method, determiner 140 may determine the density of a plurality of three-dimensional points in accordance with the size of a mesh where the three-dimensional position to be estimated exists. That is, determiner 140 determines that the smaller the size of a mesh, the higher the density. Additionally, for example, in the second interpolation method, determiner 140 may determine the density of a plurality of three-dimensional points in accordance with the number of three-dimensional points included in a region where the three-dimensional position to be estimated exists. That is, determiner 140 determines that the larger the number of three-dimensional points included in the region, the higher the density. In this manner, determiner 140 determines the search range such that the higher the density of three-dimensional points in the region where the three-dimensional position exists, the smaller the search range.

As described above, although it has been assumed that determiner 140 determines the estimation accuracy of a three-dimensional position with the plurality of methods, one of these methods may be employed, or a plurality of them may be combined and used.

Note that the three-dimensional position calculated for each pixel may be indicated by the distance from the first viewpoint to a point on the three-dimensional shape corresponding to the pixel, or may be indicated by three dimensional coordinates in a coordinate system having the first viewpoint as the origin. Additionally, among the pixels of the distance image, the pixels in regions where the generated three-dimensional shape do not exist in the first frame need not include information indicating three-dimensional positions, or may include information indicating that they do not include the information indicating the three-dimensional positions. Additionally, although it has been assumed that determiner 140 calculates, for each of a plurality of pixels included in the projection frame, the three-dimensional position on the three-dimensional shape corresponding to the pixel, it is not limited to calculation for each pixel, and determiner 140 may calculate, for each of a plurality of regions on the projection frame, the three-dimensional position on the three-dimensional shape corresponding to the region. That is, instead of calculating the three-dimensional position on the three-dimensional shape in units of pixels, determiner 140 may calculate the three-dimensional position on the three-dimensional shape in units of regions. Here, a region is a set of a predetermined number of pixels, and is, for example, a block having a predefined size in terms of the number of vertical pixels and the number of horizontal pixels.

Generator 150 generates a three-dimensional model of the subject based on a plurality of frames obtained from storage 120 by obtainer 130, the camera parameters, and the search range. Generator 150 searches for a similar point that is similar to a first point on the first frame in a range corresponding to the search range on other frames (for example, a second frame) different from the first frame. Generator 150 limits the epipolar line corresponding to the first point in the second frame to a length that is in accordance with the search range, and searches for a similar point that is similar to the first point on the epipolar line in the second frame. Generator 150 searches for a similar point from the second frame for each of a plurality of first pixels included in the first frame. As indicated by the following Equation 10, in the combinations of the first frame and the other frames except for the first frame, generator 150 calculates the Normalized Cross Correlation (NCC) between small regions as N (I,J), and generates matching information indicating a result of performing matching between frames.

Figure 9:
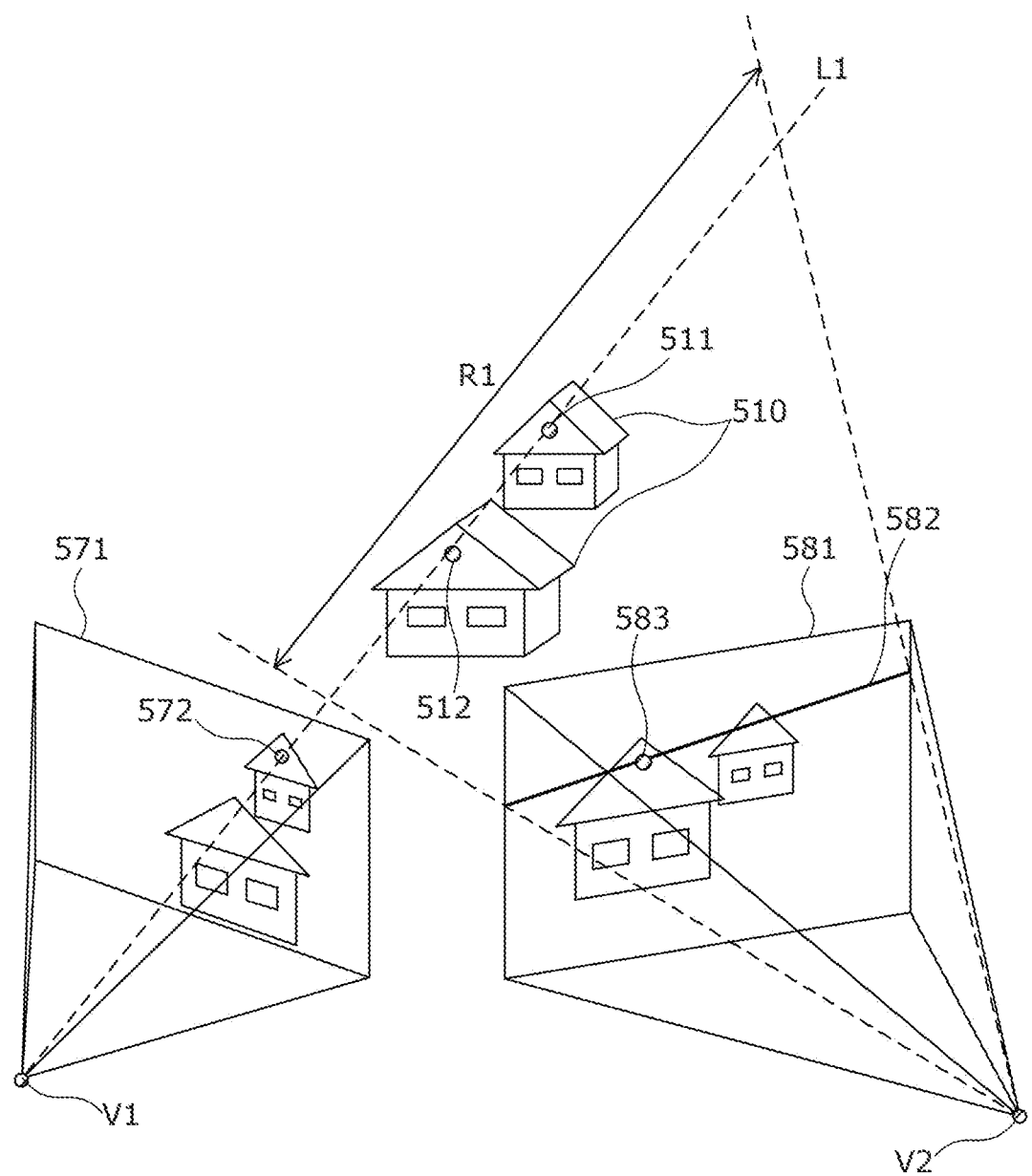
FIG. 9 is a diagram for describing matching processing in a case where a search range is not limited.
Figure 10:
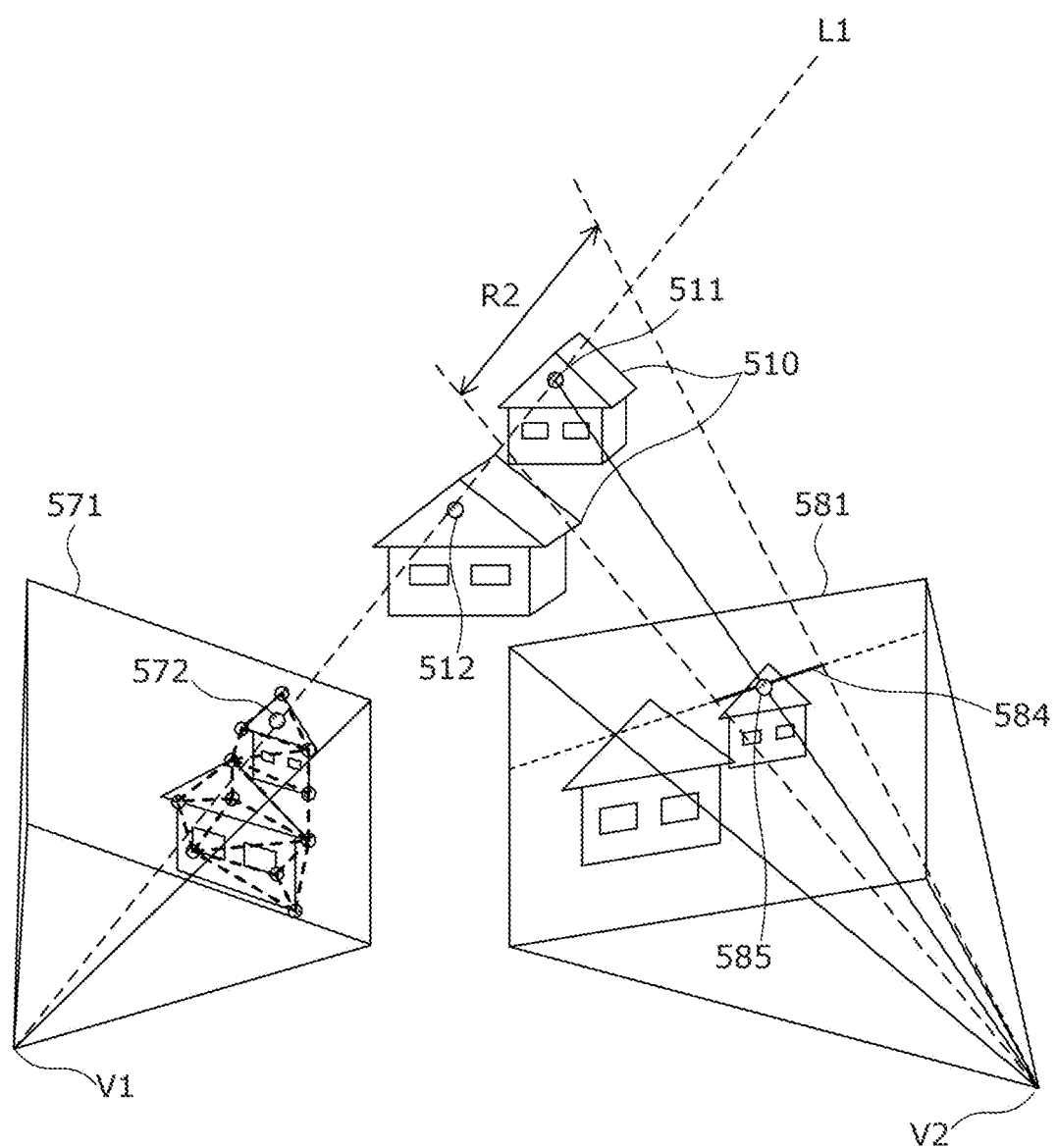
FIG. 10 is a diagram for describing matching processing in a case where a search range is limited.

Here, using FIG. 9 and FIG. 10, the advantages of limiting the search range will be specifically described. FIG. 9 is a diagram for describing matching processing in a case where a search range is not limited. FIG. 10 is a diagram for describing matching processing in a case where a search range is limited.

As illustrated in FIG. 9, when matching is performed on frame 581 in search range R1 without limitation for one pixel 572 in first frame 571, in frame 581, epipolar line 582 corresponding to straight line L1 connecting first viewpoint V1 and pixel 572 exists all the way from an end to the other end of frame 581. Note that first frame 571 is an image obtained at first viewpoint V1, and frame 581 is an image obtained at second viewpoint V2. Straight line L1 coincides with the shooting direction of camera 301 at first viewpoint V1. Pixel 572 corresponds to point 511 of subject 510. Therefore, searching for a pixel of frame 581 similar to pixel 572 is performed on epipolar line 582 without limitation. Thus, when there are two or more pixels having a feature similar to pixel 572 on epipolar line 582, pixel 583 corresponding to point 512, which is different from point 511 of subject 510, in frame 581, may be erroneously selected as a similar point. Accordingly, the generation accuracy of a three-dimensional model is deteriorated.

On the other hand, as illustrated in FIG. 10, search range R2 is determined to be a search range shorter than search range R1 illustrated in FIG. 9 by processing by determiner 140. Therefore, matching is performed on frame 581 in search range R2 with limitation for one pixel 572 in first frame 571, and in frame 581, epipolar line 584 corresponding to straight line L1 connecting first viewpoint V1 and pixel 572 becomes shorter than epipolar line 582 so as to match search range R2. Therefore, searching for a pixel of frame 581 that is similar to pixel 572 is performed in epipolar line 584, which is shorter than epipolar line 582. Thus, it is possible to reduce pixels having a feature similar to pixel 572, and it is possible to increase the possibility that pixel 585, which corresponds to point 511 of subject 510, in frame 581 is determined to be a similar point. Therefore, the generation accuracy of a three-dimensional model can be improved. Additionally, since the search range can be narrowed, the processing time for searching can be reduced.

Generator 150 generates a three-dimensional model by implementing triangulation using the position and orientation of each camera 301, and the matching information. Note that matching may be performed on all the combinations of two frames of a plurality of frames.

[Math. 4]

$$N(I, J) = \frac{\sum (I_{xy} - \overline{I_{xy}}) \cdot (J_{xy} - \overline{J_{xy}})}{\sqrt{(I_{xy} - \overline{I_{xy}})^2} \sqrt{(J - \overline{J_{xy}})^2}}$$ (Equation 10)

Note that $I_{xy}$ and $J_{xy}$ are the pixel values in small regions of frame I and frame J. Additionally, $\overline{I_{xy}}$ [Math. 5]

and $\overline{J_{xy}}$ [Math. 6]

are the average values of the pixel values in the small regions of frame I and frame J, respectively.

Then, generator 150 generates a three-dimensional model by using a search result in the matching. Accordingly, generator 150 generates the three-dimensional model including three-dimensional points, the number of which is larger and the density of which is higher than the three-dimensional points included in the map information.

Outputter 160 outputs the three-dimensional model generated by generator 150. Outputter 160 includes, for example, an antenna, a communication circuit, a connector, etc. for communicatively connecting to a display device such as a display, which is not illustrated, by wires or wirelessly. Outputter 160 outputs an integrated three-dimensional model to the display device, so as to cause the display device to display the three-dimensional model.

[Operation of Three-Dimensional Model Generation Device]

Figure 8:
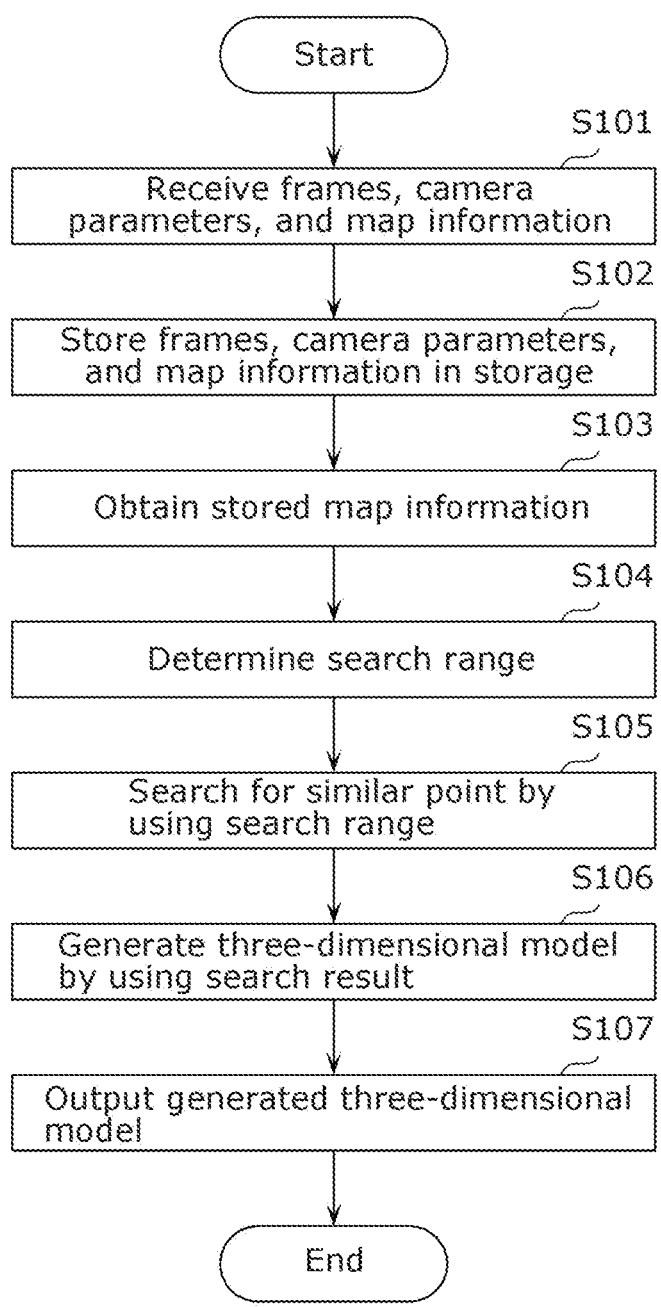
FIG. 8 is a flowchart illustrating an example of the operation of a three-dimensional model generation device.

Next, the operation of three-dimensional model generation device 100 will be described by using FIG. 8. FIG. 8 is a flowchart illustrating an example of the operation of three-dimensional model generation device 100.

First, in three-dimensional model generation device 100, receiver 110 receives, from estimation device 200, a plurality of frames that have been shot by a plurality of cameras 301, the camera parameters of each camera 301, and map information (S101). Step S101 is an example of a first obtaining step and a second obtaining step. Note that receiver 110 need not receive the frames, the camera parameters, and the map information at 1 timing, and may receive each of them at different timings. That is, the first obtaining step and the second obtaining step may be performed at the same timing, or may be performed at different timings.

Next, storage 120 stores the frames shot by cameras 30, the camera parameters of each camera 301, and the map information that are received by receiver 110 (S102).

Next, obtainer 130 obtains the map information stored in storage 120, and outputs the obtained map information to determiner 140 (S103).

Determiner 140 determines a search range to be used for matching of a plurality of points between a plurality of frames, based on the map information obtained by obtainer 130 (S104). Step S104 is an example of a determination step. The details of step S104 will be omitted, since the details of step S104 have been described in the description of the processing performed by determiner 140.

Next, generator 150 searches for a similar point that is similar to a first point on a first frame in the range corresponding to the search range on a second frame (S105), and generates a three-dimensional model by using the search result (S106). Step S105 is an example of a matching step. Step S106 is an example of a generation step. The details of step S105 and step S106 will be omitted, since the details of step S105 and step S106 have been described in the description of the processing performed by generator 150.

Then, outputter 160 outputs the three-dimensional model generated in generator 150 (S107).

(Advantageous Effects, Etc.)

A three-dimensional model generation method according to the present embodiment includes: obtaining map information generated by camera calibration executed by controlling one or more cameras to shoot a subject from a plurality of viewpoints, the map information including three-dimensional points each indicating a position on the subject in a three-dimensional space (S101); obtaining a first image from a first view point and a second image from a second viewpoint (S101); determining a search range in the three-dimensional space, based on the map information, the search range including a first three-dimensional point on the subject, the first three-dimensional point corresponding to a first point in the first image (S104); searching for a similar point that is similar to the first point, in a range in the second image which corresponds to the search range (S105); and generating a three-dimensional model using a search result in the searching (S106).

According to the three-dimensional model generation method, the search range is determined based on the map information, and a similar point that is similar to a first point on one first image is search for in a range that corresponds to a search range on the second image which is limited by the search range. In this manner, in the three-dimensional model generation method, since the search for the similar point is performed in a range in which the similar point is highly likely to be present, based on the map information, the similar point search accuracy can be improved and the time required for the search processing can be shortened. Therefore, the three-dimensional model generation accuracy can be improved, and the processing time for the three-dimensional model generation processing can be shortened.

Furthermore, for example, the search range is a range in a shooting direction from the first viewpoint from which one first image is shot. In the searching (S105), an epipolar line in the second image is limited to a length that is in accordance with the search range, and the similar point that is similar to the first point is searched for on the epipolar line in the second image, the epipolar line corresponding to the first point.

Accordingly, since the similar point that is similar to the first point is searched for on an epipolar line that has been limited to a length that is in accordance to the search range, the search accuracy of the similar point can be improved and the time needed for the search processing can be shortened.

Furthermore, for example, the determining (S104) includes interpolating, using the three-dimensional points included in the map information, a three-dimensional point at which the subject is estimated to be present, the three-dimensional point being interpolated between two points included in the three-dimensional points. In the determining, the search range is determined using the three-dimensional points after interpolation in the interpolating.

Accordingly, since a three-dimensional point at which the subject is estimated to be present is interpolated between two points of the three-dimensional points, the search range can be accurately determined.

Furthermore, for example, in the interpolating, the three-dimensional point at which the subject is estimated to be present is interpolated in a region defined by three points included in the three-dimensional points.

Accordingly, since a three-dimensional point at which the subject is estimated to be present is interpolated in a region defined by three points of the three-dimensional points, the search range can be accurately determined.

Furthermore, for example, in the determining (S104): a distance image is generated by estimating, for each of regions in a projection frame obtained by projecting the three-dimensional points onto one first image, a three-dimensional position on the subject which corresponds to the region and has, as a reference, the first viewpoint from which the first image is shot, the distance image including the three-dimensional positions respectively estimated for the regions; and the search range is determined based on each of the three-dimensional positions of the regions in the distance image.

Accordingly, since a three-dimensional position is calculated for each of regions on the projection frame, as many three-dimensional positions as required for matching can be calculated.

Furthermore, for example, in the determining (S104), for the search range which is determined for each of the regions in the distance image, the search range is set to be wider as an estimation accuracy of the three-dimensional position of the region is lower. Accordingly, by setting the search range to be wider as the accuracy of the interpolated three-dimensional position on the three-dimensional shape, it is possible to determine a search range that is in accordance with the accuracy.

Furthermore, for example, the estimation accuracy of the three-dimensional position is higher as a distance of the three-dimensional position from the first viewpoint is less. For this reason, it is possible to determine a search range that is in accordance with the distance of the three-dimensional position from the first viewpoint.

Furthermore, for example, the estimation accuracy of the three-dimensional position is higher as the three-dimensional position is closer to at least one among the three-dimensional points. For this reason, it is possible to determine a search range that is in accordance with the distance of the three-dimensional position from at least one of the three-dimensional points.

Furthermore, for example, the estimation accuracy of the three-dimensional position is higher as a density of the three-dimensional points in the region in which the three-dimensional position is present is higher. For this reason, it is possible to determine a search range that is in accordance with the density of the three-dimensional points in the region in which the three-dimensional position is present.

(Variations)

In the three-dimensional model generation method according to the above-described embodiment, although it has been assumed that a plurality of three-dimensional points included in the map information are used to perform interpolation of a three-dimensional point at which the subject is estimated to be present between a plurality of three-dimensional points, interpolation need not be performed. Additionally, although it has been assumed that, in the matching, searching of a similar point of the first point in the first frame is searched for from the epipolar line in the other frame, the similar point may be searched without using the epipolar line.

For example, the three-dimensional model generation device may calculate a first three-dimensional point close to a first three-dimensional position on a subject corresponding to a first point on a first frame, project the first three-dimensional point onto other frames, and search for a similar point of the first point from a predetermined range including the projected first three-dimensional point. Note that the predetermined range may be a range having a two-dimensional area, or may be a range having a one-dimensional length. Note that, when the predetermined range is a range having a one-dimensional length, the predetermined range may be a range on an epipolar line.

Other Embodiments

Although the three-dimensional model generation method, etc., according to the present disclosure has been described based on the embodiments described above, the present disclosure is not limited to the foregoing embodiments.

For example, in the foregoing embodiments, each of the processing units included in the three-dimensional model generation device is described as being implemented by a CPU and a control program. For example, each of the structural components of these processing units may be configured of one or more electronic circuits. Each of the one or more electronic circuits may be a general-purpose circuit or a dedicated circuit. The one or more electronic circuits may include, for example, a semiconductor device, an integrated circuit (IC), or a large-scale integration (LSI), etc. The IC or LSI may be integrated in a single chip or several chips. Although referred to here as IC or LSI, the name may change depending on the scale of integration, and may be referred to as a system LSI, very large scale integration (VLSI), or ultra large scale integration (ULSI). Furthermore, a field programmable gate array (FPGA) that can be programmed after manufacturing of the LSI may be used for the same purpose.

Furthermore, general or specific aspects of the present disclosure may be implemented as a system, an apparatus, a method, an integrated circuit, or a computer program. Alternatively, the general or specific aspects of the present disclosure may be implemented as a non-transitory computer-readable recording medium, such as an optical disc, a hard disk drive (HDD), or a semiconductor memory, on which the computer program is recorded. Furthermore, the general or specific aspects of the present disclosure may be implemented as any combination of a system, an apparatus, a method, an integrated circuit, a computer program, and a recording medium.

The present disclosure also includes forms obtained by making various modifications to the above embodiments that can be conceived by those skilled in the art, as well as forms realized by combining structural components and functions in the embodiments, without departing from the essence of the present disclosure.

INDUSTRIAL APPLICABILITY

The present disclosure can be applied to a three-dimensional model generation device or a three-dimensional model generation system, and can be applied to, for example, figure creation, topography or building structure recognition, human activity recognition, free-viewpoint video generation, or the like.

The invention claimed is:

1. A three-dimensional model generation method executed by an information processing device, the three-dimensional model generation method comprising:
    obtaining a sparse three-dimensional point cloud representing a three-dimensional shape of a subject in a three-dimensional space;
    obtaining a first image of the subject shot from a first viewpoint and a second image of the subject shot from a second viewpoint;
    determining a search range in the three-dimensional space, based on the sparse three-dimensional point cloud, the search range including a first three-dimensional point on the subject, the search range being a range in a shooting direction of a first camera from the first viewpoint and in which the first three-dimensional point is more likely to be present than in another range, the first three-dimensional point corresponding to a first point in the first image;
    searching for a similar point that is similar to the first point, in a range in the second image which corresponds to the search range; and
    generating a three-dimensional model including a three-dimensional point cloud that is denser than the sparse three-dimensional point cloud using a search result in the searching.

2. The three-dimensional model generation method according to claim 1, wherein
    in the searching, an epipolar line in the second image is limited to a length that is in accordance with the search range, and the similar point that is similar to the first point is searched for on the epipolar line in the second image, the epipolar line corresponding to the first point.

3. The three-dimensional model generation method according to claim 1, wherein the determining includes interpolating, using three-dimensional points included in the sparse three-dimensional point cloud, a three-dimensional point at which the subject is estimated to be present, the three-dimensional point being interpolated between two points included in the three-dimensional points, and in the determining, the search range is determined using the three-dimensional points after interpolation in the interpolating.

4. The three-dimensional model generation method according to claim 3, wherein in the interpolating, the three-dimensional point at which the subject is estimated to be present is interpolated in a region defined by three points included in the three-dimensional points.

5. The three-dimensional model generation method according to claim 1, wherein in the determining:

a distance image is generated by estimating, for each of regions in a projection image obtained by projecting three-dimensional points included in the sparse three-dimensional point cloud onto the first image, a three-dimensional position on the subject which corresponds to the region and has the first viewpoint as a reference, the distance image including the three-dimensional positions respectively estimated for the regions; and the search range is determined based on each of the three-dimensional positions of the regions in the distance image.

6. The three-dimensional model generation method according to claim 5, wherein in the determining, for the search range which is determined for each of the regions in the distance image, the search range is set to be wider as an estimation accuracy of the three-dimensional position of the region is lower.

7. The three-dimensional model generation method according to claim 6, wherein the estimation accuracy of the three-dimensional position is higher as a distance of the three-dimensional position from the first viewpoint is less.

8. The three-dimensional model generation method according to claim 6, wherein the estimation accuracy of the three-dimensional position is higher as the three-dimensional position is closer to at least one three-dimensional point among the three-dimensional points.

9. The three-dimensional model generation method according to claim 6, wherein the estimation accuracy of the three-dimensional position is higher as a density of the three-dimensional points in the region in which the three-dimensional position is present is higher.

10. The three-dimensional model generation method according to claim 1, wherein the first image and the second image are included among images shot for the camera calibration.

11. The three-dimensional model generation method according to claim 1, wherein in the determining, the search range is determined to be a range within an epipolar line which is in the second image and corresponds to the first point, the search range being shorter than a length of the epipolar line.

12. The three-dimensional model generation method according to claim 1, wherein the sparse three-dimensional point cloud includes three-dimensional points each indicating a three-dimensional position obtained for each set of a plurality of sets of similar points between the first image and the second image.

13. The three-dimensional model generation method according to claim 1, wherein the sparse three-dimensional cloud is included in map information generated by camera calibration executed by controlling one or more cameras to shoot a subject from a plurality of viewpoints, and the camera calibration is a process of estimating positions and orientations of the one or more cameras.

14. A three-dimensional model generation device comprising:

a processor; and memory, wherein using the memory, the processor:

obtains a sparse three-dimensional point cloud representing a three-dimensional shape of a subject in a three-dimensional space;

obtains a first image of the subject shot from a first viewpoint and a second image of the subject shot from a second viewpoint;

determines a search range in the three-dimensional space, based on the sparse three-dimensional point cloud, the search range including a first three-dimensional point on the subject, the search range being a range in a shooting direction of a first camera from the first viewpoint and in which the first three-dimensional point is more likely to be present than in another range, the first three-dimensional point corresponding to a first point in the first image;

searches for a similar point that is similar to the first point, in a range in the second image which corresponds to the search range; and generates a three-dimensional model including a three-dimensional point cloud that is denser than the sparse three-dimensional point cloud using a result of the search.

* * * * *